United States Patent [19]

Kadouchi et al.

[11] Patent Number: 4,977,043
[45] Date of Patent: Dec. 11, 1990

[54] RECTANGULAR SEALED ALKALINE STORAGE BATTERY WITH NEGATIVE ELECTRODE COMPRISING HYDROGEN STORAGE ALLOY

[75] Inventors: Eiji Kadouchi, Hirakata; Isao Matsumoto, Osaka; Takabumi Fujii, Suita; Hiroshi Sato, Uji; Takashi Hino, Hirakata, all of Japan

[73] Assignee: Matsushita Electric Industrial Co., Ltd., Osaka, Japan

[21] Appl. No.: 471,931

[22] Filed: Jan. 29, 1990

[30] Foreign Application Priority Data

Dec. 13, 1989 [JP] Japan .................................. 1-323349

[51] Int. Cl.$^5$ ...................... H01M 2/12; H01M 10/34
[52] U.S. Cl. ........................................ 429/54; 429/59; 429/101; 429/169
[58] Field of Search ...................... 429/54, 59, 101, 57, 429/223

[56] References Cited

U.S. PATENT DOCUMENTS

| | | | |
|---|---|---|---|
| 3,976,502 | 8/1976 | Sekido et al. | 429/59 |
| 4,605,603 | 8/1986 | Kanda et al. | 429/59 |
| 4,636,445 | 1/1987 | Yamano et al. | 429/101 |
| 4,637,967 | 1/1987 | Keem et al. | 429/101 |
| 4,696,873 | 9/1987 | Yagasaki et al. | 429/59 |
| 4,898,794 | 2/1990 | Doi et al. | 429/101 |

Primary Examiner—Donald L. Walton
Attorney, Agent, or Firm—Stevens, Davis, Miller & Mosher

[57] ABSTRACT

The present invention relates to improvement of an active material of a negative electrode in a rectangular sealed alkaline storage battery. That is, by using a hydrogen storage alloy as the active material of the negative electrode, a capacity density as a battery can be enhanced and besides, mounting a space for the battery in equipments which use the battery can be reduced and dischargeability and storability can be improved.

74 Claims, 6 Drawing Sheets

RECTANGULAR SEALED ALKALINE STORAGE BATTERY WITH NEGATIVE ELECTRODE COMPRISING HYDROGEN STORAGE ALLOY

BACKGROUND OF THE INVENTION

The present invention relates to a sealed alkaline storage battery which uses hydrogen in a hydrogen storage alloy as an active material of a negative electrode and, in particular, to a rectangular sealed storage battery having an external shape of, for example, a square column which is improved in capacity density.

RELATED ART

Recently, in the portable electronic equipments such as AV equipments and communication equipments which have become popular, their miniaturization and lightening in weight and reduction in thickness are desired and besides, cells for power sources of these equipments are demanded to have a high energy density. Mostly, sealed alkaline storage batteries are used for these power sources and thus a high volume density and space saving are also strongly desired for cells used as power sources.

At present, nickel-cadmium storage batteries are representatives of sealed alkaline storage batteries and these batteries have recently been rapidly made higher in capacity density. Furthermore, for space saving, nickel-cadmium storage batteries having a rectangular external shape, not an ordinary cylindrical shape, are recently commercially available.

The portion in which a battery is put in various portable equipments is mostly a rectangular space, and if cylindrical batteries are put in this space, there are unnecessary superfluous spaces between adjacent batteries, while if rectangular batteries are used, there are substantially no superfluous spaces. Therefore, use of suitable rectangular batteries makes it possible to reduce the actually necessary space by about 30% as compared with use of cylindrical batteries.

In addition, it is easier to reduce the thickness of rectangular batteries than that of cylindrical batteries, and the rectangular batteries are suitable for equipments which require a thin space for containing the batteries. From such viewpoint, nickel-cadmium storage batteries have began to be put to practical use, but in order to further improve a capacity density, it is important to develop a new battery system to which are applied materials which are expectable to afford a higher energy density than that afforded by the nickel-cadmium batteries.

Recently, development of a high capacity density metal oxide-hydride storage battery which is made using an electrode of a hydrogen storage alloy which can store hydrogen at a high density has become noticeable because such electrode has a higher energy density than a cadmium electrode. Thus, notice has been given to development of batteries of a high capacity and high space efficiency by applying the above battery system to the rectangular battery. However, for application to the power source of the recent portable equipments, it has been strongly desired that the battery has a high charging efficiency and high speed chargeability. Development of a rectangular sealed battery with use of a hydrogen storage alloy requires a new method for the construction of batteries and method for the production of materials for the construction of such batteries in addition to the conventional techniques for the construction of batteries. For this purpose, the following technical problems must be solved.

(1) Problems relating to current collection of a negative electrode:

In case of a rectangular battery of a high charging efficiency, it is preferred to construct an electrode stack by stacking a plurality of positive and negative electrodes. However, when leads are welded to electrodes of a hydrogens storage alloy for collection of current, there is a problem in safety that there may occur ignition due to heat at the welding portion. This ignition more readily occurs when hydrogen is stored in the alloy electrode. Furthermore, according to only the conventional technique in which collection of current is carried out by taking out one lead from each negative electrode, welding these leads at one position and press contacting the negative electrode outside the electrode stack with an external metal case, current is concentrated to one welded point to cause increase in electrical resistance, resulting in increase of the internal resistance of battery and, as a result, dischargeability decreases especially at discharging of a high rate.

(2) Problems relating to sealed structure:

When a sealed alkaline storage battery is constructed using a hydrogen storage alloy as an active material of negative electrode, in spite of the continual state of charging and discharging, hydrogen gas in an amount corresponding to the equilibrium pressure of hydrogen stored in the alloy is present in the battery. Since hydrogen gas is small in molecular radius, if a very small void is present, it releases outside through the void. As a result, hydrogen as active material of the negative electrode decreases to cause the reduction of capacity of battery. Such problem is not seen in the sealed Ni-Cd battery when used at normal state. Therefore, for solving this problem peculiar to an Ni-H battery, the sealability of the battery must be improved.

(3) Problems in rapid charging:

When charging is conducted with a large current of about 1 C for carrying out rapid charging, a pressure in the battery rises owing to the generation of oxygen gas from a positive electrode at the end of charging and generation of hydrogen liberated due to the insufficient hydrogen absorption rate of the hydrogen storage alloy of the negative electrode. In case of a rectangular battery where the side walls of the sealing container are composed of planes, being different from cylindrical battery, the side walls are readily distorted by the internal pressure and the metal container reaches the yielding point at a low pressure. Therefore, the tolerable internal pressure of such battery is governed by the yielding point of the container and is specifically about 12 kg/cm$^2$ for the cell vessel materials of conventional cylindrical cells, and thus increase of the internal pressure of battery must be controlled so that it is lower than said pressure.

SUMMARY OF THE INVENTION

The principal object of the present invention is to solve the problems above by using a hydrogen storage alloy as an active material of negative electrode and employing a suitable construction, material and construction method for increasing the capacity of battery and to ensure a capacity density higher than that of the conventional rectangular nickel-cadmium storage battery and rapid chargeability, dischargeability, storability and safety in production equal to and higher than those of the conventional rectangular nickel-cadmium storage battery.

DETAILED DESCRIPTION OF THE INVENTION

Figures 1A, 1B, 1C:
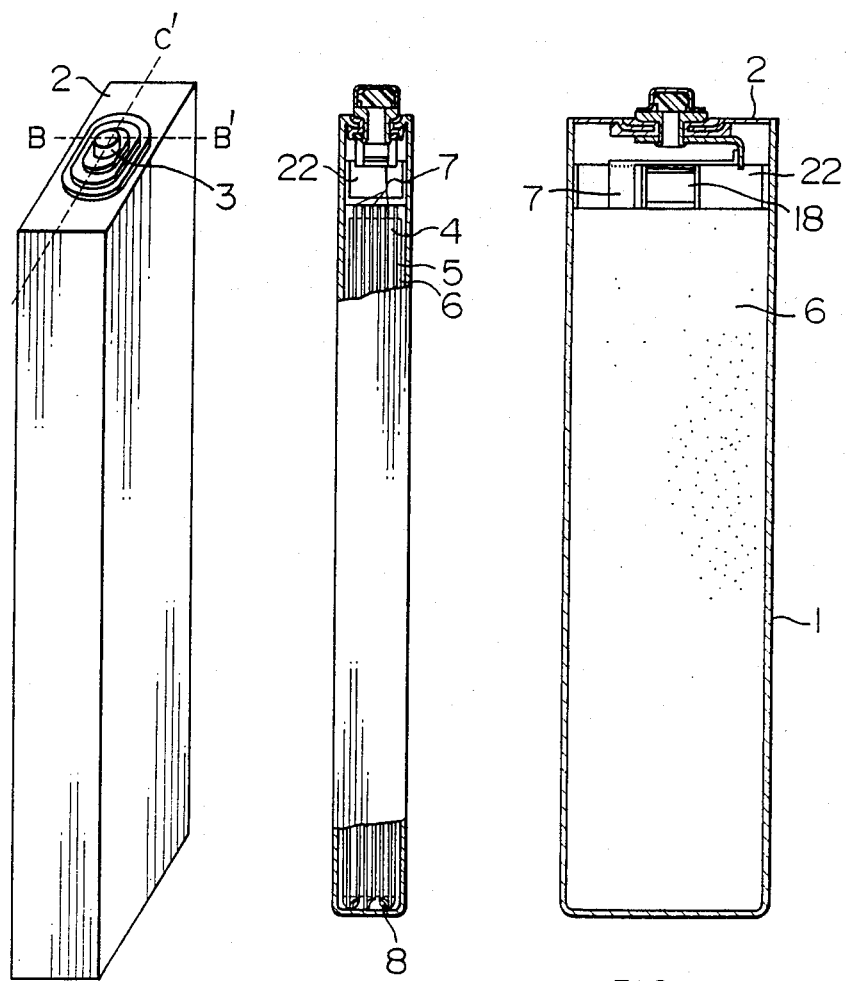
FIG. 1(A), (B) and (C) are an oblique view of the battery made in Example 1, a cross-sectional view of the battery cut along line B—B', and a cross-sectional view of the battery cut along line C—C', respectively.

According to the present invention, for the construction by which the high capacity density and safety in production can be attained, a hydrogen storage alloy powder is packed in a three-dimensional network metal matrix (hereinafter referred to as "matrix") and besides, a portion is provided in this matrix where the alloy powder is not packed and which is press molded and used as an elastic lead portion for collection of current. Collection of current by an outer case is carried out by press contacting a large area of the negative electrode or the lead for collection of current with the outer metallic case by the expansion of an electrode stack generated when the electrode stack is inserted in the outer case.

By employing such construction, shedding of the hydrogen storage alloy caused by charging and discharging can be prevented and in addition, volume occupied by the matrix of electrode can be reduced to 5% or less and thus an electrode comprising a hydrogen storage alloy and having a high capacity density can be obtained.

Furthermore, collection of current to the outer base is carried out by contacting the powder-unpacked portion of the matrix with the case, whereby operations such as welding which causes ignition can be omitted and an electrode structure for collection of current less in the number of production steps and excellent in safety can be obtained. Furthermore, collection of current by negative electrodes at the central part of the electrode stack is performed by direct contact of the matrix with the outer metallic case and contact in a large area becomes possible and the internal resistance of battery can be reduced.

Furthermore, a battery of further higher capacity density can be constructed by combining the negative electrodes with the positive electrodes of a high energy density made using the same matrix as mentioned above.

By adding metallic cobalt such as carbonyl cobalt to the active material of a positive electrode, precharged section can be given to negative electrode correspondingly to an electric quantity for the metallic cobalt being converted to a higher oxide such as cobalt oxyhydroxide or cobalt sesquioxide at the initial charging after construction of the battery. In other words, the precharged section is necessary for improving the discharging characteristics of the negative electrode, but by employing the above construction, it is not necessary to electrochemically charge the negative electrode before construction of the battery. When the negative electrodes are handled at a charged state, namely, at the state of hydrogen being absorbed, there is a danger of ignition, but safety can be increased by the addition of metallic cobalt to the active material of the positive electrode.

Moreover, the battery of the present invention is provided with a safety valve which is composed of a rubber valve body and a hollow rivet and which works at a pressure higher than the hydrogen dissociation equilibrium pressure of the hydrogen storage alloy.

The hollow rivet here is fixed to the outer case of battery by caulking through an insulating material and serves also as terminal for collection of current of the positive electrode.

Prior to caulking, a sealing material is coated between a rivet-insulating material, an insulating material-outer case of battery, and a rubber valve body-rivet.

By employing such construction, a taghole provided at the outer metallic case can be made minimum and besides, by filling and sealing respective gaps with a sealing material, desorption of hydrogen can be prevented and, as a result, the reduction of capacity of the negative electrode can be inhibited.

Furthermore, in the present invention, in order to improve rapid chargeability, the following means are adopted: (1) For example, a powdery fluororesin is coated on the surface of the hydrogen storage alloy electrode which is a negative electrode to impart hydrophobic properties to the surface of electrode; (2) A gas reduction catalyst such as palladium is provided in the battery; and (3) An electrolyte is injected in an amount of 1.5–2.7 ml per 1 Ah of the positive electrode.

Thus, the electrolyte in a separator, positive electrode and negative electrode are enough to carry out the charge-discharge reaction and besides, by setting the amount of the electrolyte to produce the suitable space portion and by providing a hydrophobic layer on the surface of the negative electrode, three phase interfaces of gas-liquid-solid are widely formed on the surface of the negative electrode, whereby oxygen gas evolved from the positive electrode designed to be less in capacity than the negative electrode at overcharging and hydrogen gas liberated from the negative electrode due to the delay of absorption reaction are rapidly led to the surface of the electrodes and the reaction therebetween to return to water can be accelerated. Similarly, oxygen gas and hydrogen gas are rapidly reacted by the catalyst provided in the battery to return to water, whereby the increase of internal pressure of battery at the time of overcharging can be prevented and chargeability can be improved to be rapid.

Further greater advantages can be obtained by subjecting the surface of catalyst to hydrophobic treatment or by separating the catalyst from the electrode stack and surrounding it with a hydrophobic resin to reduce the penetration of electrolyte.

The present invention is explained in detail by the following examples.

EXAMPLE 1

First, production of the battery of the present invention shown in FIG. 1 will be explained below in the order of negative electrode, electrode stack, sealing cap and set batteries.

In FIG. 1, 1 indicates an outer metallic case, 2 indicates a metallic lid body, 3 indicates a terminal of positive electrode, 4 indicates a positive electrode, 5 indicates a separator which wraps the positive electrode, 6 indicates a U-shaped negative electrode, and 7 indicates a lead of the positive electrode.

First, the steps of production of negative electrode 6 will be explained.

Figure 4:
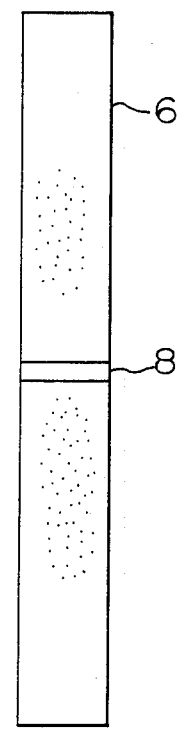
FIG. 4 shows a negative electrode before folded double.

Misch metal mainly composed of about 40 wt % of cerium, about 30 wt % of lanthanum, and about 13 wt % of neodymium, nickel, cobalt, aluminum and manganese were mixed at an atomic ratio of 1:3.5:0.8:0.3:0.4 and the mixture was molten in a high-frequency melting furnace of an inert gas atmosphere, then transferred to a container having a cooling device under stirring and rapidly cooled therein. The resulting alloy was roughly ground by a mechanical means, then heated to 1050° C. in argon and kept at this temperature for 3 hours to obtain a hydrogen storage alloy having an SF value of 2.5 or less. The SF value means the flatness of a plateau region of PTC curve generally used for evaluation of the hydrogen storage alloy and is calculated by ln ($P_{H/M}=0.75/P_{H/M}=0.25$), Wherein $P_{H/M}=0.75$ and $P_{H/M}=0.25$ show the hydrogen equilibrium pressure when hydrogen is absorbed in an amount corresponding to 0.75 atom and 0.25 atom per one metal element which constitutes the hydrogen storage alloy. This alloy was again ground to a powder of 37 μm or less. Further, this powder was immersed in an aqueous potassium hydroxide solution (7 N) of 80° C. for 30 minutes, then washed with water and dried to obtain an alloy powder having innumerable irregularities in the portion of about 0.01 μm thick in the vicinity of the surface layer To the resulting hydrogen storage alloy was added 0.5 wt % of polyvinyl alcohol, followed by kneading with water to obtain a paste. The paste was packed in a foamed nickel porous body (porosity: about 98%; thickness: about 0.7 mm; average diameter of spherical voids 400 μm), dried, then pressed and cut to obtain negative electrode 6 shown in FIG. 4 of 0.4 mm in thickness, 15 mm in width and 115 mm in length and having, in the middle portion, negative electrode lead 8 which is an active material-unpacked portion of 3 mm in length 0n this negative electrode was uniformly coated a fluororesin at a density of 0.8 mgcm². The composition of the alloy is not limited to the above-mentioned one. Alloys to be used preferably have a flat PTC curve and have an SF value of 0.25 or less and have the formula: $Mm_{1-x}M_{1x}Ni_yM_{2z}$ wherein Mm represents a Misch metal, $M_1$ represents at least one of Ca, Ti and Zr, $M_2$ represents at least one element selected from the group consisting of Co, Al, Mn, Cu, Cr, Fe and V, $1 > x \geq 0$, $y > 3.0$ and $4.5 \leq y+z \leq 5.5$. The treatment for producing irregularities on the surface of the alloy can be any treatments which can produce fine irregularities on the surface of alloy such as etching with an alkali and besides, etching with an acid or salt and a physical etching method. As a matrix for alloy powder, a foamed nickel porous body was used hereabove having a three-dimensional network structure, but any other matrices such as metallic fibers can be used as far as they have a three-dimensional network structure and have an alkali resistance. A fluororesin was used for the hydrophobic treatment hereabove, but polyolefin resins and other materials having hydrophobic properties can also be used in the present invention. The hydrophobic resin is not limited to the powder in its shape, but can be of any shape as far as the hydrophobic property can be imparted to the surface of the negative electrode.

In the above, lead portion 8 of negative electrode 6 was formed by forming an active material-unpacked portion by mechanical pressing prior to packing of the active material in the porous body, but it is also possible to form the active material-unpacked portion by masking lead portion 8 or by removing the active material in the lead portion by some methods after the active material has been packed. In this example, the foamed nickel porous body having the three-dimensional network structure was used as a matrix for the negative electrode. However, a matrix made by mixing a hydrogen storage alloy with a proper binder, coating the mixture on an expanded metal or porous substrate and subjecting the coated substrate to water-repelling treatment may be used. In such case, lead portion 8 may be formed by removing the active material and exposing the porous substrate or expanded metal. Furthermore, in this example, part of the support for negative electrode was used as lead portion 8, but an alkali-resistant metal plate may be folded in a V- or U-shape to electrically contact the surface of negative electrode with expansion of the electrode stack and collect current.

Next, 100 parts by weight of a nickel hydroxide powder, 6 parts by weight of cobalt oxide and 3 parts by weight of metallic cobalt were mixed and the mixture was kneaded with addition of water to obtain a paste. This paste was packed in a foamed nickel porous body (porosity: 98%; thickness: 0.7 mm; average diameter of spherical voids: 400 μm), dried and pressed to obtain a foamed metal type nickel positive electrode 4 of 14 mm ×55 mm and 0.6 mm thick and 300 mAh in capacity.

Figure 3:
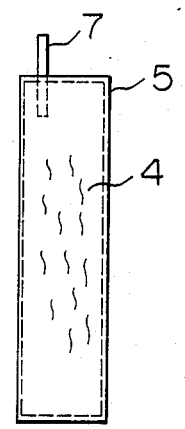
FIG. 3 shows a positive electrode wrapped by a separator.

Nickel lead 7 for collection of current was spot welded to this positive electrode 4 and, as shown in FIG. 3, this positive electrode was wrapped in a bag produced by heat sealing separator 5 (0.22 mm thick) of a polypropylene nonwoven fabric into which sulfon group was introduced. The separator may be beforehand modified by the treatment with, for example, an aqueous cautic potassium or sodium solution to substitute potassium or sodium for the hydrogen atom of the sulfon group. In this example, a mixture comprising nickel oxide as a main component to which cobalt was added was used as active material of positive electrode, but salts of other metals such as manganese which can carry out redox reaction in an aqueous alkali solution can also be used as additives.

Figure 2:
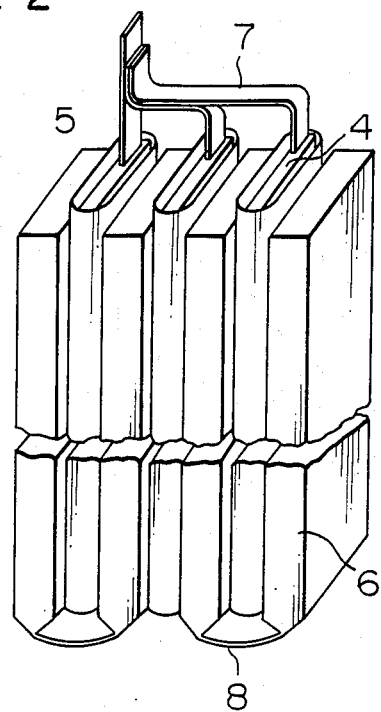
FIG. 2 is an enlarged oblique view which shows the electrode stack in the battery of FIG. 1.

An electrode stack as shown in FIG. 2 was formed using two U-shaped negative electrodes 6 and three positive electrodes 4. In FIG. 2, 8 indicates a lead of negative electrode which is a bottom part when the negative electrode is folded. This electrode stack was inserted in outer metallic case 1 of 5.2×60×16.5 mm. Then, nylon frame body 22 in which a redox catalyst was inserted was provided at the upper part of this electrode stack.

Materials of frame body 22 can be any materials having alkali resistance and electrical insulation properties. For example, polypropylene, polyethylene, polyvinyl chloride and fluororesin can be used. A redox catalyst which comprised a carbon carrier on which palladium was supported and was subjected to the hydrophobic treatment with Teflon resin was used in, this example, but any carriers can be used as far as they have alkali resistance and there can be used, for example, alumina, magnesia, zirconia and a sintered type nickel porous body. As catalyst, there may be used palladium and other platinum group catalysts. The hydrophobic treatment can be performed not only with fluororesins, but also with paraffins, silcone type hydrophobic treating agents and the like.

Figure 5A:
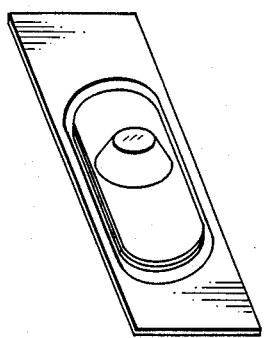
FIG. 5(A), (B) and (C) are an oblique view, a cross-sectional view and a partial view of the lid body of the battery of FIG. 1.
Figure 5B:
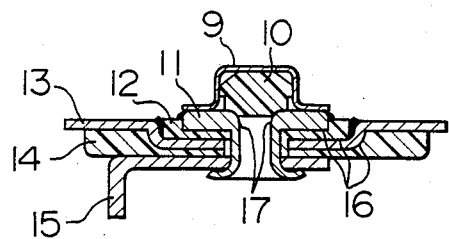
Figure 5C:
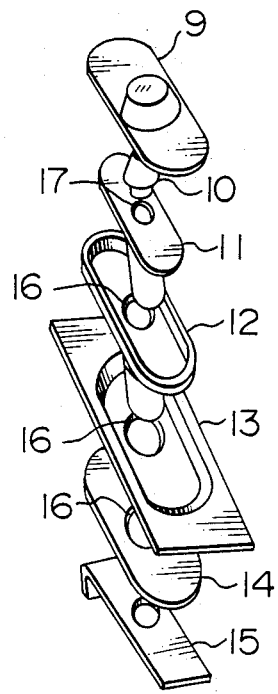
Figure 6:
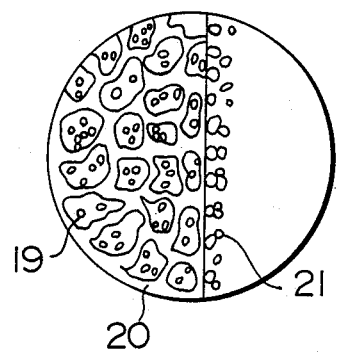
FIG. 6 is an enlarged cross-sectional view of the surface part of the negative electrode of the battery of FIG. 1.

Next, the production of the lid body is explained referring to FIG. 5.

First, a nickel plated steel sheet was cut into a rectangle of 5.2×16.5 mm and a hole of 3 mm was made at the center thereof to form washer portion 13. Then, upper gasket 12 and lower gasket 14 were made by molding a nylon resin. Separately, cap 9 and washer 15 for collection of current of the positive electrode were obtained by punching a nickel plated sheet by a metal mold.

Then, valve body 10 was obtained by molding a rubber. Blown asphalt as a hydrophobic material was coated on the upper and lower parts of opening of washer 13 and upper gasket 12 and lower gasket 14 were put thereon from upper and lower directions. Furthermore, blown asphalt was coated on the hole portion of upper gasket 12 and hollow rivet 11 having the site nearly corresponding to the shape of the cavity of the washer was inserted into the hole. Therein was further inserted washer 15 for collection of current of the positive electrode from the lower direction and the whole assembly was applied with a pressure in the vertical direction and the tip of leg of the hollow rivet was expanded and caulked. Then, polybutene as a liquid sealing agent was coated onto the hole portion of the hollow rivet body 10 and rubber valve body 10 was put thereon and cap 9 and the seating of hollow rivet 11 were spot welded while pressing by cap 9 from the above. The lid body was obtained by the above procedure. In this example, the upper and lower gaskets were made of nylon, but they may be also made of polyethylene resin polypropylene resin, and fluororesin. Furthermore, blown asphalt and polybutene were used as hydrophobic material, but other petroleum pitch and fluororesin may also be used. To washer 15 for collection of current of the positive electrode of the thus obtained lid body was spot welded the end of positive electrode lead 7 extending upwardly from the electrode stack and 1.5 ml of an electrolyte comprising an aqueous potassium hydroxide solution containing a small amount of lithium hydroxide was injected and the lid body was fitted with the port of metallic outer case 1 and this portion was sealed by a laser seam welding machine In this way, battery A as shown in FIG. 1 was obtained.

A comparative example is shown below

First, a foamed metal type nickel positive electrode of 14×55 mm with 0.4 mm thick and of a capacity of 200 mAh was prepared by a conventional method. A nickel lead for collection of current was spot welded to this positive electrode. This was wrapped in a bag prepared by a heat sealing polyamide nonwoven fabric of 0.22 mm thick. As a negative electrode, a paste type cadmium negative electrode of 15 ×57 mm with 0.6 mm thick and having a predischarged section about 1.7 time that of the above positive electrode and a discharging preliminary capacity about 0.3 time that of the positive electrode was prepared A lead portion was previously provided at the upper part of the negative electrode by exposing and projecting the core portion thereof in the form of a tongue An electrode stack was assembled using three of the thus produced positive electrodes and four of the negative electrodes.

This electrode stack was inserted into a metallic case of 5.2×60×16.5 mm in internal size. Then, a nylon frame was inserted and an electrolyte comprising an aqueous potassium hydroxide solution containing a small amount of lithium hydroxide was injected into the case Then, the lead of positive electrode was welded to a rectangular sealer having gaskets by a conventional method and, thereafter, the upper part of the case was caulked and the sealer was fitted thereto to obtain battery D.

Figure 10:
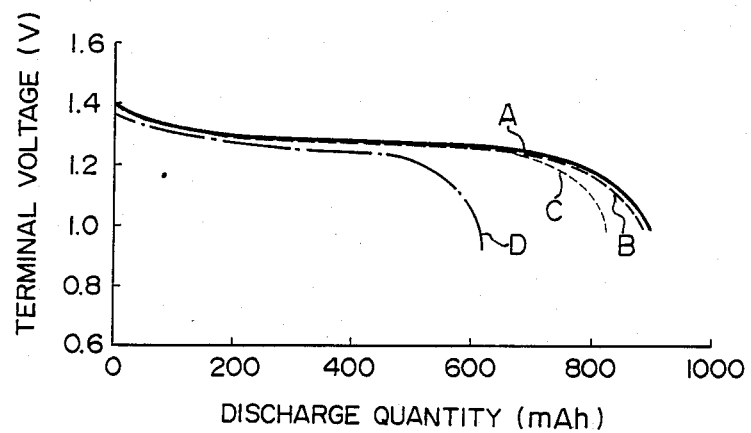
FIG. 10 is a graph which shows the discharge characteristics of the battery according to the present invention and a conventional battery.

As shown in FIG. 10, battery A had a capacity density improved by 50% over that of the conventional nickel-cadmium battery D and was improved by 100% in capacity density over the cylindrical battery taking into consideration the mounting into devices. In this example, by packing the hydrogen storage alloy powder in a three-dimensional network metallic matrix, a negative electrode of high capacity density can be obtained and besides, the alloy powder which becomes finer by repetition of charging and discharging can be securely held. Furthermore, by adoption of a resealable safety valve which works at higher than a hydrogen equilibrium pressure and lower than 12 kg/cm$^2$, safety against abnormal increase of an internal cell pressure can be attained. Moreover, by coating a sealing material to respective parts which constitute a lid body, there can be obtained a structure according to which hydrogen does not leak out of the battery even if the battery is left for a long time. In addition, by using a U-shaped negative electrode, collection of current can be conducted by allowing one surface of the electrode to contact the outer case, and the internal resistance of battery can be reduced and a discharge potential equal to or higher than that obtained by a conventional nickel-cadmium battery can be obtained as shown in FIG. 10 and besides, a step of welding of a lead wire to a negative electrode at which ignition is apt to occur can be omitted to increase safety in steps.

With reference to rapid chargeability, by employing a suitable amount of an electrolyte, a proper gas-liquid-solid three phase interfaces can be securely present in the separator and on the surface of the negative electrode and by subjecting the surface of the negative electrode to hydrophobic treatment, the effect can be further improved and further by providing a catalyst which causes the reaction beteween liberated hydrogen and oxygen evolved from the positive electrode, gas can be favorably reduced to prevent distortion of the case.

EXAMPLE 2

Figure 7:
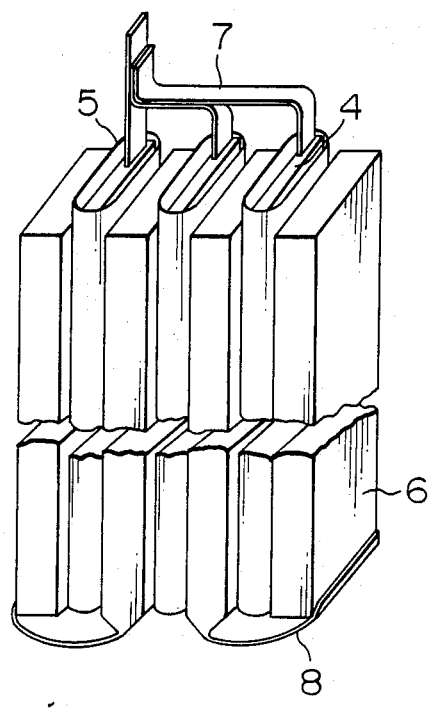
FIG. 7 is an oblique view which shows the construction of the electrode stack of Example 2.
Figure 8A:
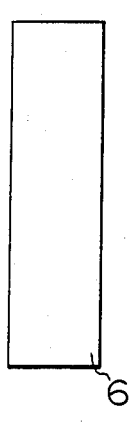
FIG. 8 shows the negative electrode of the electrode stack of FIG. 7.
Figure 8B:
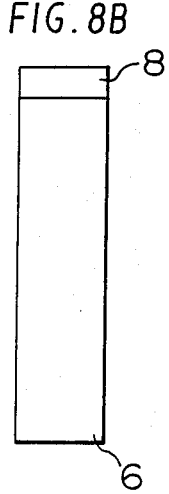

FIG. 7 shows an electrode stack according to another embodiment of the present invention and FIG. 8 shows a negative electrode used for fabrication of this electrode stack.

Figure 11:
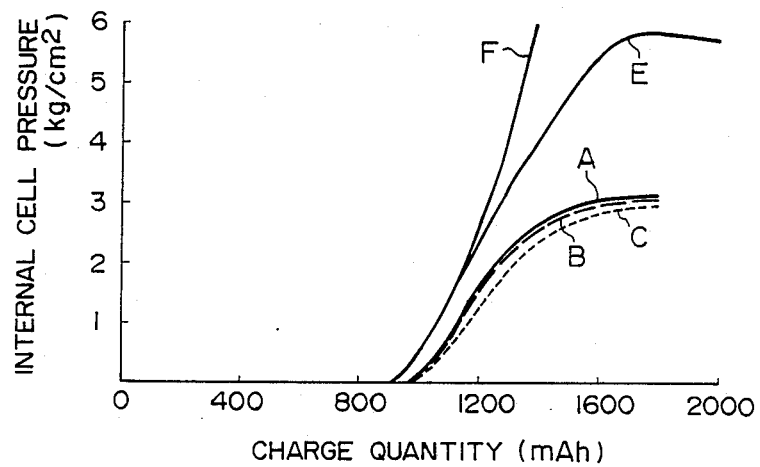
FIG. 11 is a graph which shows a pressure in the battery of the present invention and that in conventional one when these batteries were charged at 20° C.

FIG. 10 shows discharge characteristics when battery B of this example was charged with 90 mA at an ambient temperature of 20° C. for 15 hours and, after ceasing in 1 hour, was discharged with 180 mA. Furthermore, FIG. 11 shows behavior of an internal cell pressure when battery B was charged with a constant current of 900 mA at an ambient temperature of 20° C.

The procedure of production of this battery will be explained below.

First, a hydrogen storage alloy powder which was the active material of the negative electrode was prepared in the same procedure as in Example 1. Next, this powder was packed in a foamed nickel porous body (porosity: about 98%; thickness: about 0.7 mm; average diameter of spherical voids: 400 μm), then was dried, pressed and cut to obtain two kinds of negative electrodes, namely, a negative electrode of 0.4 mm thick, 15 mm wide and 57 mm long and a negative electrode of 62 mm long and having a lead of active material-unpacked portion of 5 mm wide at one end of longer direction. A positive electrode was prepared by wrapping in a bag of separator in the same manner as in Example 1.

The electrode stack as shown in FIG. 7 was prepared by combining two of the thus produced two of negative electrodes with three of the positive electrodes. Lead 8 of the negative electrode was formed by press molding the foamed nickel porous body prior to packing the active material, but it can be also formed by covering the lead portion with masking at the time of filling of the active material and filling the portion with no active material or by removing the active material of the lead portion by some method after filling of the active material. In this example, the foamed nickel porous body having the three-dimensional network structure was used as a matrix for the negative electrode. However, a matrix made by mixing a hydrogen storage alloy with a proper binder, coating the mixture on an expanded metal or porous substrate and subjecting the coated substrate to water-repelling treatment may be used. In such case, lead portion 8 may be formed by removing the active material and exposing the porous substrate or expanded metal. Battery B was made using the thus obtained electrode stack in the same manner as in Example 1. The battery B had nearly the same performance as that of battery A of Example 1. In Example 1, it was difficult to fabricate the electrode stack when the number of the negative electrode was four or more while in Example 2, the electrode stack can be fabricated irrespective of the number of the negative electrode.

Next, in a comparative example, a negative electrode of 15×57 mm with 0.4 mm thick wholly filled with a hydrogen storage alloy was prepared in the same manner as in Example 1. When it was attempted to weld a nickel lead for collection of current, ignition occurred by the heat of spot welding machine. Therefore, it was necessary to carry out the welding in an inert gas atmosphere and this causes increase in cost.

As mentioned above, according to the present invention, the current collecting portion of the negative electrode can be formed with safety and with no risk of ignition.

EXAMPLE 3

Figure 9:
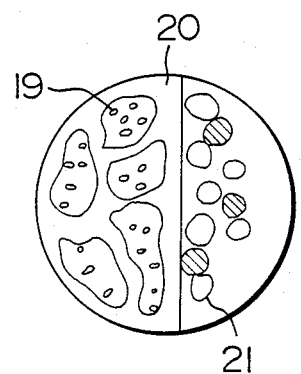
FIG. 9 is an enlarged view of the surface of the negative electrode of the battery of Example 3.

FIG. 9 shows an enlarged surface of the negative electrode of battery C made in this example. Curve C in FIG. 10 shows discharge characteristics when this battery was charged with 90 mA at an ambient temperature of 20° C. for 15 hours and, after cease of charging for 1 hour, was discharged with 180 mA. FIG. 11 shows the behavior of an internal cell pressure when this battery was charged with a constant current of 900 mA in an atmosphere of 20° C.

The procedures of production of this battery will be explained below.

The procedures of production of the negative electrode is as follows. A hydrogen storage alloy powder was prepared in the same manner as in Example 1. This powder was packed in a foamed nickel porous body and press molded and a fluroresin powder was coated on the surface of the porous body. Then, commercially available palladium black was coated on the surface of this negative electrode at a concentration of 4 mg/cm$^2$. Thereafter, battery C was made in the same manner as in Example 1 except that any catalyst was not inserted in the resin frame body. Palladium black was used as catalyst applied to the surface of the negative electrode in this example, but a fine powder of other platinum group catalysts and mixtures thereof, these catalysts supported on a carbon black powder, and catalysts supported on other alkali resistant fine powder catalyst carriers may also be used.

The thus obtained battery C had nearly the same performance as that of battery A of Example 1.

For comparison, battery E was made in the same manner as in making of battery C except that only the fluroresin was coated on the surface of the negative electrode and battery F was made also in the same manner as in making of battery C except that nothing was coated on the surface of the negative electrode. These batteries C, E and F were charged with a constant current of 900 mA in an atmosphere of 20° C. and the behavior of an internal cell pressure are shown in FIG. 11.

As can be seen from FIG. 11, battery E showed a higher internal cell pressure with progress of charging than batteries A and C and battery F showed further increase of the internal cell pressure than battery E.

That is, rapid chargeability can be improved by providing a redox catalyst in battery or by hydrophobic treatment of the surface of the negative electrode.

EXAMPLE 4

An electrode stack was fabricated in the same manner as in Example 1.

Then, a redox catalyst was inserted in a nylon frame body and this was inserted in a metallic case together with the electrode stack. Next, the lid body used in battery A of Example 1 was constructed without using the sealing materials such as blown asphalt and polybutene. Battery G was fabricated using these components. Similarly, battery H was fabricated using the electrode stack of Example 1 and a lid body constructed without any sealing material. These batteries A, G and H were charged with 80 mA at 20° C. for 15 hours, then stored for 1 month at 20° C. and discharged with a constant current of 160 mA. Capacity and retention of capacity in this case are shown in the following table.

| Battery | Discharge capacity (mAh) | Retention of capacity |
|---|---|---|
| A | 700 | 80% |
| G | 300 | 33% |
| H | 480 | 80% |

As can be seen from the above results, reduction of capacity was conspicuous in a rectangular nickel-hydride battery in which blown asphalt or polybutene was not applied to the lid body while the battery in which a sealing material was applied ensured the retention of capacity equal to or higher than that of the nickel-cadmium battery in which the sealing material was not applied. It was recognized that hydrogen gas leaked out of battery G which showed conspicuous reduction of capacity. It was found that reduction in capacity of the negative electrode caused reduction in capacity of battery.

As explained above, the present invention can provide an alkaline storage battery which has a high capacity density and can be enhanced in mounting the density without deterioration of dischargeability, chargeability and storage stability and reduction of safety in fabrication of battery.

What is claimed is:

1. A rectangular sealed alkaline storage battery comprising a rectangular metallic case which contains electricity generation elements and is sealed by a metallic lid body provided with a safety valve wherein said electricity generation elements comprises:
   (a) rectangular positive electrodes comprising an active material mainly composed of a metal oxide,
   (b) rectangular negative electrodes mainly composed of a hydrogen storage alloy powder and a matrix having electroconductivity, at least a part of the surface of electrodes being imparted with hydrophobic properties,
   (c) an alkaline electrolyte, and
   (d) separators which electrically insulate between the positive electrode and negative electrode, have therein a proper space from the electrolyte necessary for charging and discharging reaction and are chemically stable against alkali;
   both the left and right outer most sides of an electrode stack comprise the negative electrodes and directly contact the metallic case and the positive electrodes are connected, through a lead, to terminals provided, being insulated from the metallic lid body 2. A battery according to claim 1, wherein the metal oxide which is a main component of the positive electrodes is mainly nickel oxide or manganese oxide 3. A battery according to claim 1, wherein the positive electrodes have a structure comprising a three-dimensional network matrix in which a metal oxide powder is packed.

4. A battery according to claim 3, wherein the three-dimensional porous matrix is a foamed metal network matrix or a nonwoven fabric composed of metallic fiber.

5. A battery according to claim 3, wherein the active material of the positive electrodes is nickel oxide or hydroxide to which is added at least one member selected from the group consisting of cobalt oxide, cobalt hydroxide and metallic cobalt.

6. A battery according to claim 1, wherein the hydrogen storage alloy is an alloy having an SF value of 0.25 or less and represented by the formula: $Mm_{1-x}M1_xNi_yM2_z$ wherein Mm represents a Misch metal comprising a mixture of rare earth metals, MI represents at least one metal selected from the group consisting of Ca, Ti and Zr, $M_2$ represents at least one metal selected from the group consisting of Co, Al, Mn, Cu, Cr, Fe and V, $1 > x \geq 0$, $y > 3.0$ and $4.5 \leq y+z \leq 5.5$, and the SF value means the flatness of a plateau region of PCT curve generally used for the evaluation of the hydrogen storage alloy and is calculated by ln $(P_{H/M}=0.75/P_{H/M}=0.25)$, wherein $P_{H/M}=0.75$ and $P_{H/M}=0.25$ show the hydrogen equilibrium pressure when hydrogen is absorbed in an amount corresponding to 0.75 atom and 0.25 atom per one metal element which constitutes the hydrogen storage alloy.

7. A battery according to claim 6, wherein the hydrogen storage alloy is a powder having innumerable irregularities on the surface.

8. A battery according to claim 7, wherein the irregularities on the surface of the powder are formed by etching with an alkali or an acid.

9. A battery according to claim 1, wherein at least a part of the surface of the negative electrodes is coated with a fluororesin or a polyolefin resin.

10. A battery according to claim 1, wherein the negative electrodes have the structure comprising a three-dimensional network matrix in which the hydrogen storage alloy powder is packed.

11. A battery according to claim 10, wherein the three-dimensional network matrix is a foamed metallic porous body or a nonwoven fabric composed of metallic fibers.

12. A battery according to claim 1, wherein the porous separator is a polyolefin resin matrix subjected to hydrophilic treatment.

13. A battery according to claim 12, wherein the hydrophilic treatment comprises sulfonation of the polyolefin matrix.

14. A battery according to claim 13, wherein a part of hydrogen of sulfone group introduced into the matrix by the hydrophilic treatment is substituted with Na or K.

15. A battery according to claim 1, wherein the alkaline electrolyte is mainly composed of an aqueous potassium hydroxide solution and is injected in an amount of 1.5–2.7 ml per 1 Ah of the capacity of the positive electrode.

16. A battery according to claim 15, wherein the alkaline electrolyte contains at least one compound selected from the group consisting of LiOH and NaOH.

17. A battery according to claim 1, wherein the safety valve has the structure that a rubber valve body is press contacted with the hollow portion of a hollow rivet which communicates inside of the battery with the outer atmosphere and on-off difference in pressure of the valve body is within the range of from the hydrogen equilibrium pressure of hydrogen storage alloy to 12 kg/cm$^2$.

18. A battery according to claim 17, wherein the hollow rivet has the structure integrated by caulking of an electrically insulating material 19. A battery according to claim 18, wherein the electrically insulating material is a resin selected from the group consisting of polyamide resin, polyethylene resin, polypropylene resin and fluororesin.

20. A battery according to claim 18, wherein a hydrophobic material is packed between the hollow rivet and the electrically insulating material 21. A battery according to claim 20, wherein the hydrophobic material is a material selected from the group consisting of a fluororesin, petroleum pitch and polybutene.

22. A battery according to claim 18, wherein on at least one side of integral body comprising the hollow rivet and the electrically insulating material integrated by caulking, the edge portion of the rivet and the electrically insulating material are simultaneously coated with the hydrophobic material.

23. A battery according to claim 1, wherein the metallic lid body and the metallic case are welded.

24. A rectangular sealed alkaline storage battery comprising a rectangular metallic case which contains electricity generation elements and sealed by a metallic lid body provided with a safety valve wherein said electricity generation elements comprises:
(a) rectangular positive electrodes comprising an active material mainly composed of a metal oxide,
(b) rectangular negative electrodes mainly composed of a hydrogen storage alloy powder and a matrix having electroconductivity, at least a part of the surface of electrodes being imparted with hydrophobic properties,
(c) an alkaline electrolyte, and
(d) a separators which electrically insulate between the positive electrode and negative electrode, have therein a proper space from the electrolyte necessary for charging and discharging reaction and are chemically stable against alkali;
an electrode stack comprises a plurality of the positive electrodes and a plurality of the negative electrodes which are stacked and electrically insulated through separators, the positive electrodes per se are electrically connected to each other by an electrically conductive sheet or a part of the electrodes and the negative electrodes per se are electrically connected to each other by an electrically conductive sheet or a part of the electrodes, and the negative electrodes arranged on both the left and right outer most sides of the electrode stack are directly contacted with the metallic case to be electrically connected.

25. A battery according to claim 24, wherein the negative electrode is formed by folding an electrode sheet in two in nearly the middle, and one of the two is an outside negative electrode and another is an inside negative electrode and are electrically connected.

26. A battery according to claim 25, wherein nearly the middle portion of the electrode sheet is mainly composed of a matrix of electrode containing substantially no hydrogen storage alloy along the fold portion 27. A battery according to claim 25, wherein the fold portion is formed by previously pressing the corresponding portion of the three-dimensional network matrix and thereafter, further pressing the whole of the matrix filled with a hydrogen storage alloy powder.

28. A battery according to claim 27, wherein the three-dimensional network matrix is a foamed metal porous body or a nonwoven fabric composed of metallic fibers.

29. A battery according to claim 24, wherein the negative electrodes in the electrode stack comprise at least one pair of electrodes, a portion of the matrix of one of these electrodes being projected and another electrode being free from projection and these electrodes being electrically connected by folding down the projection of the former electrode over the latter electrode free from the projection.

30. A battery according to claim 29, wherein the projection comprises a foamed metallic porous body, a porous felt composed of metallic fibers, an expanded metal or a porous metallic sheet.

31. A battery according to claim 30, wherein the portion of the foamed metallic porous body or the porous felt which corresponds to the projection is pressed prior to filling with a hydrogen storage alloy powder.

32. A battery according to claim 24, wherein the negative electrodes of the electrode stack include at least one pair of adjacent electrodes which are electrically connected by a folded metallic sheet 33. A battery according to claim 24, wherein the metallic lid body and the metallic case are welded to each other.

34. A battery according to claim 24, wherein the negative electrodes of the electrode stack include at least one pair of the outermost electrode and the second electrode from the outermost electrode, a part of matrix of electrode of the latter second electrode being projected and this second electrode being electrically connected to both the outermost electrode and the metallic case by folding down the projection over the outermost electrode.

35. A rectangular sealed alkaline storage battery comprising a rectangular metallic case which contains electricity generation elements and a material having an ability of redox catalyst and is sealed by a metallic lid body provided with a safety valve wherein said electricity generation elements comprises:
(a) rectangular positive electrodes comprising an active material mainly composed of a metal oxide,
(b) rectangular negative electrodes mainly composed of a hydrogen storage alloy powder and a support having electroconductivity, at least a part of the surface of the electrodes being imparted with hydrophobic properties,
(c) an alkaline electrolyte, and
(d) separators which electrically insulate between the positive electrode and negative electrode, have therein a proper space from the electrolyte necessary for charging and discharging reaction and are chemically stable against an alkali;
the left and right outermost electrodes of the electrode stack comprise negative electrodes and directly contact the metallic case and the positive electrodes are connected, through a lead, to terminals provided being insulated from the metallic lid body.

36. A battery according to claim 35, wherein the material having an ability of redox catalyst is mainly a platinum group metal.

37. A battery according to claim 35, wherein the material having an ability of redox catalyst is mainly a platinum group metal supported on a carbon or alumina carrier which is subjected to hydrophobic treatment.

38. A battery according to claim 37, wherein the hydrophobic treatment is carried out with a fluororesin or a paraffinic or silicone hydrophobic treating agent.

39. A battery according to claim 35, wherein the material having an ability of redox catalyst is provided mainly on the surface of the hydrogen storage alloy negative electrode.

40. A battery according to claim 35, wherein the material having an ability of redox catalyst is provided in a space in the battery which is electrically insulated from the electrode stack and the terminals of the positive and negative electrodes.

41. A battery according to claim 35, wherein the material having an ability of redox catalyst is fixed by an electrically insulating frame body in the battery.

42. A battery according to claim 41, wherein the electrically insulating frame body is mainly composed of a material selected from the group consisting of polyamide, polypropylene, polyethylene, polyvinyl chloride and fluororesin.

43. A battery according to claim 35, wherein the material having an ability of redox catalyst is provided between the electrode stack and the lid body.

44. A battery according to claim 35, wherein the metal oxide which is a main component of the positive electrode is nickel oxide or manganese oxide.

45. A battery according to claim 35, wherein the positive electrodes have a structure comprising a three-dimensional network matrix in which a metal oxide powder is packed.

46. A battery according to claim 45, wherein the three-dimensional network matrix is a foamed metallic porous body or a nonwoven fabric composed of metallic fibers.

47. A battery according to claim 45, wherein the active material of the positive electrodes is a nickel oxide or hydroxide to which is added at least one member selected from the group consisting of cobalt oxide, cobalt hydroxide and metallic cobalt 48. A battery according to claim 35, wherein the hydrogen storage alloy is an alloy having an SF value of 0.25 or less and represented by the formula $Mm_{1-x}M_{1x}Ni_yM_{2z}$ wherein Mm represents a Misch metal comprising a mixture of rare earth metals, Ml represents at least one metal selected from the group consisting of Ca, Ti and Zr, $M_2$ represents at least one metal selected from the group consisting of Co, Al, Mn, Cu, Cr, Fe and V, $1 > x \geq 0$, $y > 3.0$ and $4.5 \leq y+z \leq 5.5$. and the SF value means the flatness of a plateau region of PTC curve generally used for the evaluation of the hydrogen storage alloy and is calculated by ln $(P_{H/M}=0.75/P_{H/M}=0.25)$, wherein $P_{H/M}=0.75$ and $P_{H/M}=0.25$ show the hydrogen equilibrium pressure when hydrogen is absorbed in an amount corresponding to 0.75 atom and 0.25 atom per one metal element which constitutes the hydrogen storage alloy 49. A battery according to claim 48, wherein the hydrogen storage alloy is a powder having innumerable irregularities on the surface.

50. A battery according to claim 49, wherein the irregularities on the surface of the powder are formed by etching with an alkali or an acid.

51. A battery according to claim 35, wherein at least a part of the surface of the negative electrodes is coated with a fluororesin or a polyolefin resin.

52. A battery according to claim 35, wherein the negative electrodes have the structure comprising a three-dimensional network matrix in which the hydrogen storage alloy powder is packed 53. A battery according to claim 52, wherein the three-dimensional network matrix is a foamed metallic porous body or a nonwoven fabric composed of metallic fibers.

54. A battery according to claim 35, wherein the porous separator is a polyolefin resin matrix subjected to hydrophilic treatment.

55. A battery according to claim 54, wherein the hydrophilic treatment comprises sulfonation of the polyolefin resin matrix.

56. A battery according to claim 55, wherein a part of the hydrogen of the sulfone group introduced into the matrix by the hydrophilic treatment is substituted with Na or K.

57. A battery according to claim 35, wherein the alkaline electrolyte is mainly composed of an aqueous potassium hydroxide solution and is injected in an amount of 1.5-2.7 ml per 1 Ah of the capacity of the positive electrode.

58. A battery according to claim 57, wherein the alkaline electrolyte contains at least one compound selected from the group consisting of LiOH and NaOH.

59. A battery according to claim 35, wherein the safety valve has the structure that a rubber valve body is press contacted with the hollow portion of the hollow rivet which communicates the inside of the battery with the outer atmosphere and on-off difference in pressure of the valve body is within the range of from the hydrogen equilibrium pressure of a hydrogen storage alloy to 12 $kgcm^2$.

60. A battery according to claim 59, wherein the hollow rivet has the structure integrated with an electrically insulating material by caulking of the material.

61. A battery according to claim 60, wherein the electrically insulating material is a resin selected from the group consisting of polyamide resin, polyethylene resin, polypropylene resin and fluororesin.

62. A battery according to claim 60, wherein a hydrophobic material is filled between the hollow rivet and the electrically insulating material.

63. A battery according to claim 62, wherein the hydrophobic material is a material selected from the group consisting of fluororesin, petroleum pitch and polybutene.

64. A battery according to claim 60, wherein on at least one side of the integral body comprising the hollow rivet and the electrically insulating material integrated by caulking, edge portion of the rivet and the electrically insulating material are simultaneously coated with the hydrophobic material 65. A battery according to claim 35, wherein the electrode stack comprises a plurality of positive electrodes and a plurality of negative electrodes which are stacked and electrically insulated through separators, the positive electrodes per se are electrically connected to each other by an electrically conductive sheet or a part of the electrodes and the negative electrodes per se are electrically connected to each other by an electrically conductive sheet or a part of the electrodes, and the negative electrodes arranged on the left and right outermost sides of the electrode stack are directly contacted with the metallic case to be electrically connected.

66. A battery according to claim 65, wherein the negative electrode is formed by folding an electrode sheet in two at nearly the middle, and one of the two is an outside negative electrode and another is an inside negative electrode and are electrically connected.

67. A battery according to claim 66, wherein nearly the middle portion of the electrode sheet is mainly composed of a matrix of electrode containing substantially no hydrogen storage alloy along the fold portion.

68. A battery according to claim 67, wherein the fold portion is formed by previously pressing the corresponding portion of the three-dimensional network matrix and thereafter, further pressing the whole of the electrode sheet filled with a hydrogen storage alloy powder.

69. A battery according to claim 68, wherein the three-dimensional network matrix is a foamed metal porous body or a nonwoven fabric composed of metallic fibers.

70. A battery according to claim 65, wherein the negative electrodes in the electrode stack comprise at least one pair of electrodes, a portion of matrix of one of these electrodes being projected and another electrode being free from projection and these electrodes being electrically connected by folding down the projection of the former electrode over the latter electrode free from the projection.

71. A battery according to claim 70, wherein the projection comprises a foamed metallic porous body, a porous felt composed of metallic fibers, an expanded metal or a porous metallic sheet.

72. A battery according to claim 71, wherein the portion of the foamed metallic porous body or the porous felt which corresponds to the projection is pressed prior to filling with a hydrogen storage alloy powder.

73. A battery according to claim 65, wherein the negative electrodes of the electrode stack include at least one pair of adjacent electrodes which are electrically connected by a folded metallic sheet 74. A battery according to claim 65, wherein the negative electrodes of the electrode stack include at least one pair of the outermost electrode and the second electrode from the outermost electrode, a part of matrix of electrode of the latter second electrode being projected and this second electrode being electrically connected to both the outermost electrode and the metallic case by folding down the projection over the outermost electrode.

* * * * *